US012100091B2

(12) United States Patent
He (10) Patent No.: US 12,100,091 B2
(45) Date of Patent: Sep. 24, 2024

(54) ANIMATED IMAGE PUBLISHING METHOD AND ANIMATED IMAGE GENERATING METHOD

(71) Applicant: ASUSTEK COMPUTER INC., Taipei (TW)

(72) Inventor: Yi-Xuan He, Taipei (TW)

(73) Assignee: ASUSTEK COMPUTER INC., Taipei (TW)

( * ) Notice: Subject to any disclaimer, the term of this patent is extended or adjusted under 35 U.S.C. 154(b) by 78 days.

(21) Appl. No.: 17/681,048

(22) Filed: Feb. 25, 2022

(65) Prior Publication Data

US 2023/0215073 A1 Jul. 6, 2023

(30) Foreign Application Priority Data

Jan. 4, 2022 (TW) .................................. 111100280

(51) Int. Cl.
*G06T 13/80* (2011.01)
*G06F 8/61* (2018.01)

(52) U.S. Cl.
CPC ................ *G06T 13/80* (2013.01); *G06F 8/61* (2013.01); *G06T 2200/24* (2013.01); *G06T 2213/08* (2013.01)

(58) Field of Classification Search
None
See application file for complete search history.

(56) References Cited

U.S. PATENT DOCUMENTS

| 2007/0275736 A1* | 11/2007 | Baek ................ H04M 1/72457 455/457 |
| 2013/0207973 A1* | 8/2013 | Mattila .................. G06T 13/80 345/473 |
| 2020/0293342 A1 | 9/2020 | Torman et al. |
| 2021/0224853 A1 | 7/2021 | Kholia et al. |

(Continued)

FOREIGN PATENT DOCUMENTS

| CN | 109697003 A | 4/2019 |
| CN | 112184856 A | 1/2021 |
| CN | 113793407 A | 12/2021 |

OTHER PUBLICATIONS

Claude et al.; "Phone with top-spec 18GB RAM! Description of ROG Phone 5 Ultimate" https://www.sogi.com.tw/articles/asus_rog_phone_5_ultimate/6256053; Mar. 10, 2021; pp. 1.

(Continued)

*Primary Examiner* — Jeffrey J Chow
(74) *Attorney, Agent, or Firm* — MUNCY, GEISSLER, OLDS & LOWE, PC (57) ABSTRACT

An animated image publishing method, applied to a client device, is provided. The animated image publishing method includes: analyzing animated image data; configuring the animated image data based on a predetermined rule to generate script data; transforming the script data into a script file; packaging the script file and at least one source image corresponding to the script file into a packaging file and uploading the packaging file to a network server; and providing a transformation program to a client device, where the transformation program is configured to parse the packaging file to obtain the script data and render the script data into an animated image.

7 Claims, 8 Drawing Sheets

(56) References Cited

U.S. PATENT DOCUMENTS

2023/0087879 A1\* 3/2023 An ........................ H04N 23/632
2023/0251814 A1\* 8/2023 Zhang ..................... G06F 1/263
   345/173

OTHER PUBLICATIONS

Lottie "Dynamic loading of the live gift animation is easily achieved"; Dec. 25, 2020; Internet Literature; pp. 1-8.

\* cited by examiner

ANIMATED IMAGE PUBLISHING METHOD AND ANIMATED IMAGE GENERATING METHOD

CROSS-REFERENCE TO RELATED APPLICATION

This application claims the priority benefit of Taiwan application serial No. 111100280, filed on Jan. 4, 2022. The entirety of the above-mentioned patent application is hereby incorporated by reference herein and made a part of specification.

BACKGROUND OF THE INVENTION

Field of the Invention

The disclosure relates to a user interface, and in particular, to an animated image of a user interface.

Description of the Related Art

Currently, there are two common app icons in an operating system. One app icon is a single-layer icon, and the other app icon is a double-layer icon, which is composed of an architecture with a foreground and a background.

However, these static icons are too monotonous. In order to make the icons present an animated effect, a common practice is to animate a page and play preprocessed static images frame by frame. However, if animated icons are generated in this way, a designer is required to rebuild the animated icons when adding a new effect to the animated icons, which is not only time-consuming and labor-intensive, but also has compatibility problems between an old architecture and a new architecture. In addition, the animated icons traditionally made in the manner of the animated page also occupy a relatively large memory and storage space.

BRIEF SUMMARY OF THE INVENTION

The disclosure provides an animated image publishing method, applied to a client device. The animated image publishing method includes: analyzing animated image data and configuring the animated image data to generate script data; transforming the script data into a script file; packaging the script file and at least one source image corresponding to the script file into a packaging file and uploading the packaging file to a network server; and providing a transformation program to the client device.

The disclosure further provides an animated image generating method, applied to a client device. The client device includes a transformation program and is adapted to connect to a network server, the network server includes a packaging file, and the packaging file includes a script file and at least one source image corresponding to the script file. The animated image generating method includes: downloading, by the client device, the packaging file from the network server; transforming the packaging file into the script file and the at least one source image by using the transformation program; parsing the script file by using the transformation program, to obtain script data; and transforming the script data and the at least one source image into an animated image by using the transformation program, and presenting the animated image on the client device.

By means of the animated image publishing method and the animated image generating method provided in the disclosure, the development time and modification costs of the animated image (such as an icon or a background) are saved, which is convenient for users to download and apply, so that the user interface of the client device presents more animated effects.

DETAILED DESCRIPTION OF THE EMBODIMENTS

Figure 1:
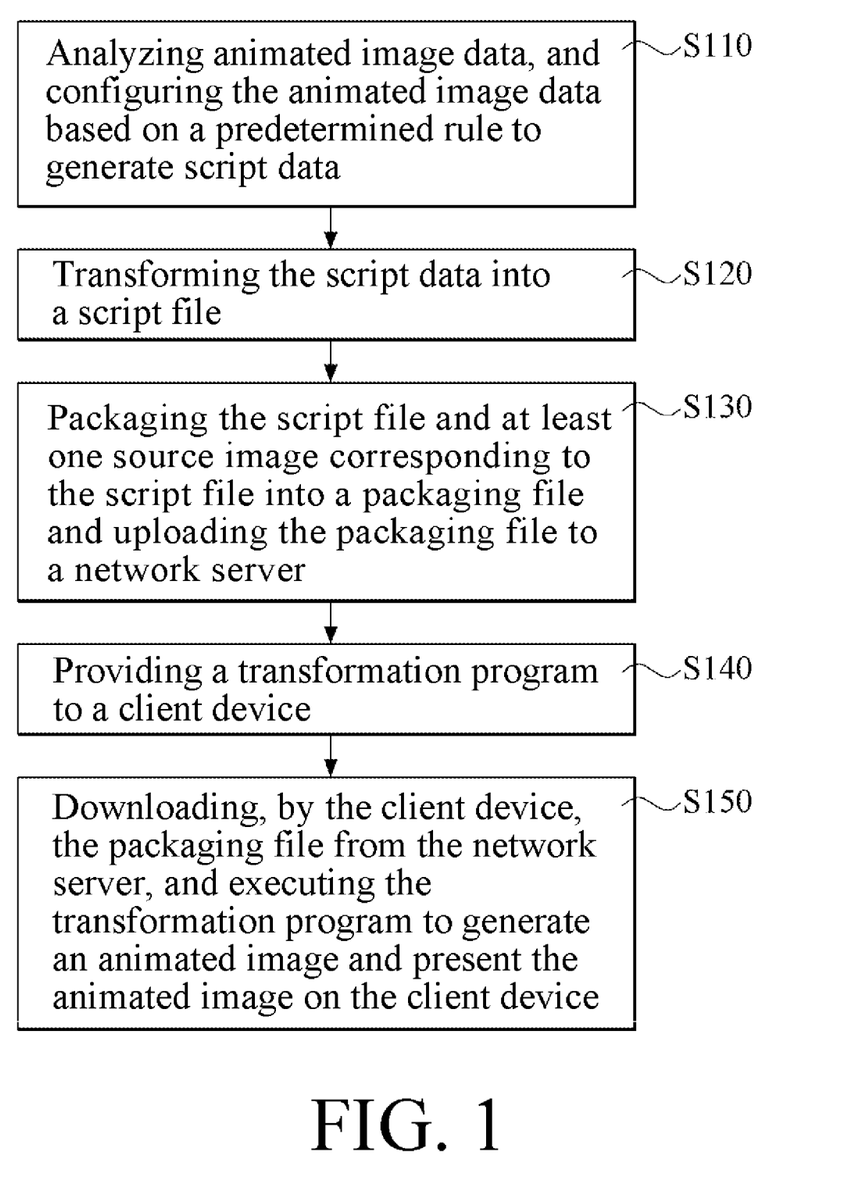
FIG. 1 is a flowchart of an animated image publishing method according to an embodiment of the disclosure.
Figure 2:
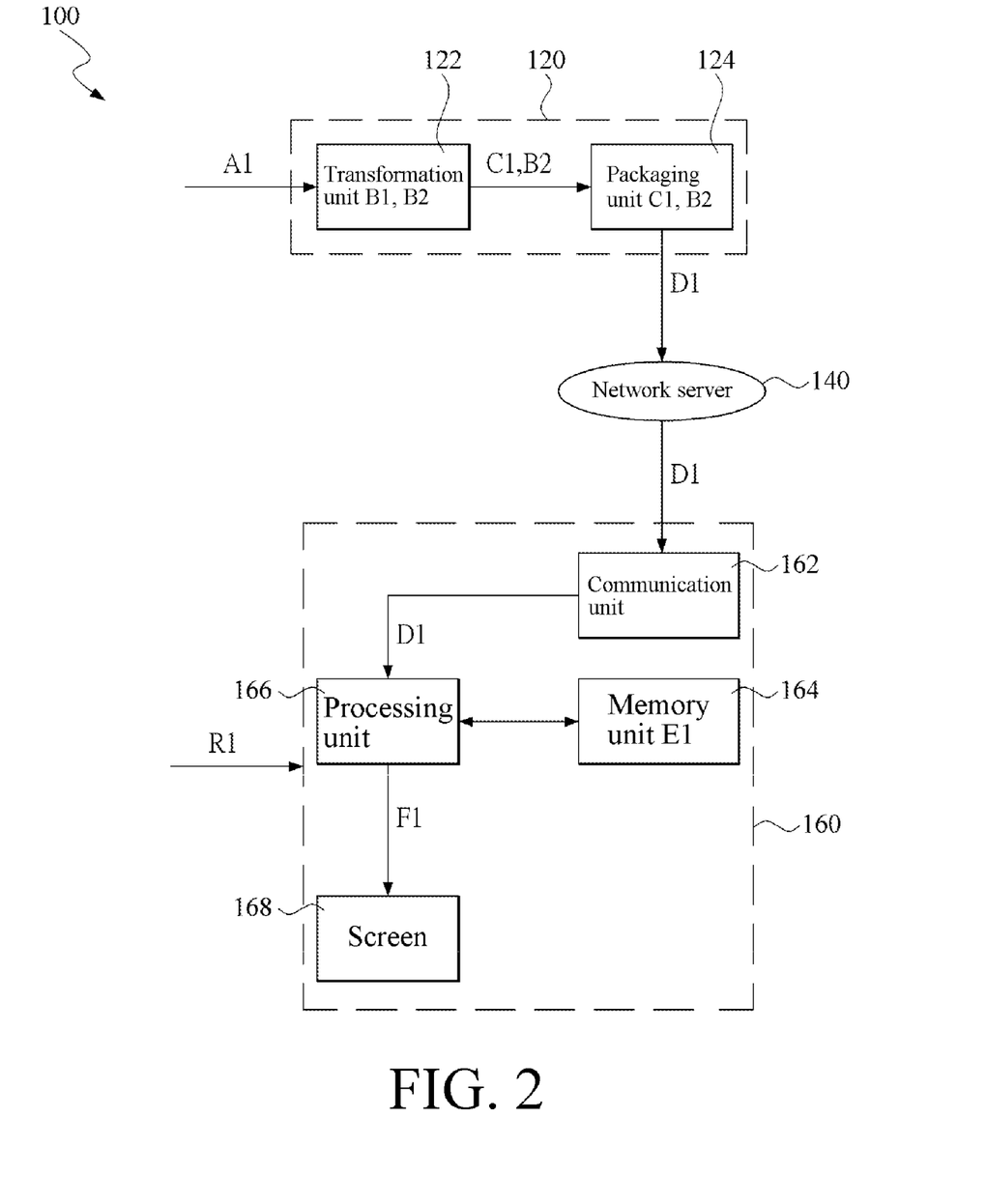
FIG. 2 shows an animated image publishing system to perform the animated image publishing method of FIG. 1.

FIG. 1 is a flowchart of an animated image publishing method according to an embodiment of the disclosure. FIG. 2 shows an animated image publishing system to perform the animated image publishing method of FIG. 1.

The animated image publishing system 100 includes a remote device 120, a network server 140, and a client device 160. The remote device 120 includes a transformation unit 122 and a packaging unit 124. The remote device 120 is a server. The client device 160 is communicatively connected with the network server 140, and downloads a file from the network server 140. The remote device 120 is communicatively connected with the network server 140, and uploads the file to the network server 140.

The animated image publishing method of the disclosure is implemented by the remote device 120, the network server 140, and the client device 160. The animated image publishing method includes the following steps. First, as described in step S110 of FIG. 1, animated image data A1 is analyzed, and the animated image data A1 is configured based on a predetermined rule to generate script data B1. Referring to FIG. 2, the step is performed by the transformation unit 122 in FIG. 2.

In one embodiment, the animated image data A1 is animated wallpaper data or animated icon data. In one embodiment, the animated image data A1 is an animated image file designed by image-editing software. In an embodiment, the animated image data A1 is a file edited by adobe after effect, adobe premiere, adobe illustrator, or adobe photoshop.

In one embodiment, the predetermined rule is to disassemble the animated image data A1 by layer to obtain source images B2 and layer information corresponding to each layer. The layer information of each layer is configured to generate the script data B1. In this way, there is no need to store the animated image in an animated manner, which helps to reduce an amount of data and facilitates subsequent editing and adjustment.

Figure 3:
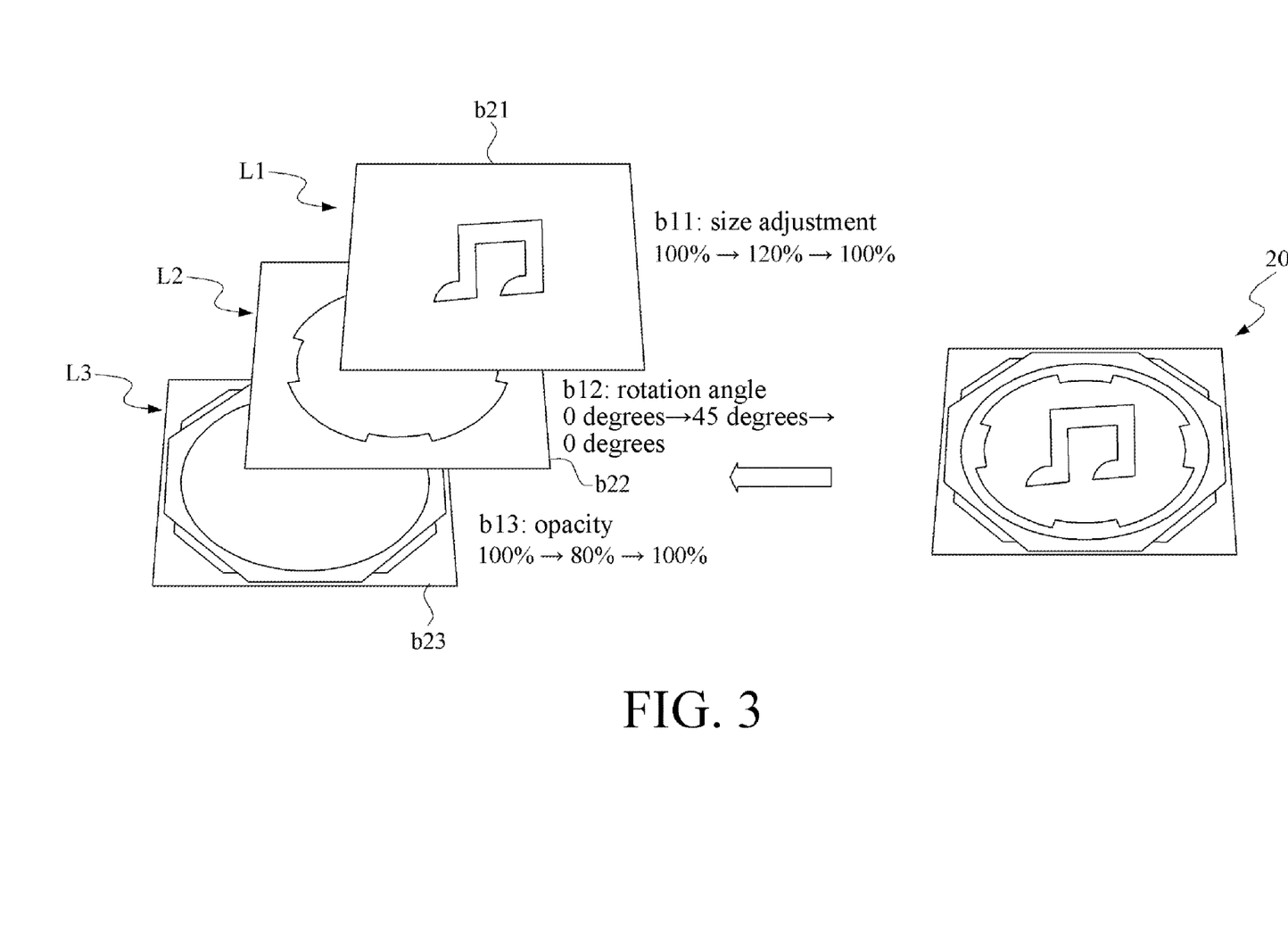
FIG. 3 shows an embodiment of an animated icon analyzed by using the animated image publishing method according to the disclosure.

Referring to FIG. 3, FIG. 3 shows an embodiment of an animated icon 20 analyzed by using the animated image publishing method according to the disclosure. The animated icon 20 is composed of a plurality of layers L1, L2, and L3. The layers L1, L2, and L3 include corresponding source images b21, b22, and b23 and corresponding layer information b11, b12, and b13. That is to say, the animated icon 20 is disassembled by layer, so that the layer information b11, b12, and b13 and the corresponding source images b21, b22, and b23 are disassembled. The layer information b11, b12, and b13 is configured to generate the script data B1.

It is to be noted that the layer information b11, b12, and b13 does not include the source images b21, b22, and b23, but only includes the information pointing to the source images b21, b22, b23 used by the layers L1, L2, and L3 and animation parameters corresponding to the source images b21, b22, and b23.

In one embodiment, the animation parameters include a rotation parameter, a light transmittance parameter, a scaling parameter, a move parameter, a time parameter, and the like. The scaling parameter is used to adjust sizes of the source images, the move parameter is used to adjust positions of the source images, and the time parameter is combined with a plurality of adjustable source images to generate different time intervals. The disclosure is not limited thereto.

Carrying on with the above embodiment, each of the layers L1, L2, and L3 uses a different one of the source images b21, b22, and b23. However, the disclosure is not limited thereto. In other embodiments, a plurality of layers L1, L2, and L3 also uses a same source image, but different animation effects are presented with different animation parameters.

As described in step S120, the script data B1 is transformed into a script file C1 to facilitate data transmission. Referring to FIG. 2, the step is performed by the transformation unit 122 in FIG. 2. In one embodiment, the script file C1 is a JSON file. That is to say, a file in the JSON format is used. However, the disclosure is not limited thereto. The script file C1 also uses other text files suitable for network data transmission.

As described in step S130, the script file C1 and the source images B2 corresponding to the script file are packaged into a packaging file D1, and the packaging file is uploaded to the network server 140 for transmission and sharing. In one embodiment, the packaging file D1 is a document file. In an embodiment, the packaging file D1 is a ZIP file. Referring to FIG. 2, the step is performed by the packaging unit 124 in FIG. 2.

The transformation unit 122 and the packaging unit 124 are software programs executed by a processor of the remote device 120, or a combination of a hardware program and a software program.

As described in step S140, a transformation program E1 is provided to a client device 160. The transformation program E1 is configured to parse the packaging file D1 to obtain the script data B1, and the script data B1 and the source images B2 are rendered into an animated image F1. The transformation program E1 is provided by the network server 140 or the remote device 120 in FIG. 2.

As described in step S150, when the client device 160 receives an animated image generating request R1, the client device 160 downloads the packaging file D1 from the network server 140, and executes the transformation program E1 to generate the animated image F1 and present the animated image on the client device 160.

After the transformation program E1 is executed, reverse operations similar to steps S120 and S130 are performed to obtain the script data B1. Furthermore, the packaging file D1 is first transformed into the script file C1 and the source images B2, and then the script file C1 is transformed into the script data B1. By using the script data B1 and the corresponding source images B2, a processing unit 166 renders the animated image F1 corresponding to the animated image data A1.

The animated image generating request R1 is from the user interface of the client device 160, or is from the network server 140 or other remote servers.

Referring to FIG. 2, the client device 160 includes a communication unit 162, a memory unit 164, a processing unit 166, and a screen 168. The processing unit 166 is electrically connected to the communication unit 162, the memory unit 164, and the screen 168. The client device 160 is a computer device, such as a smartphone or a tablet computer.

The communication unit 162 is configured to communicate with the network server 140 to download the packaging file D1. In one embodiment, the client device 160 downloads the packaging file D1 from the network server 140 by using an App store or an App Market.

In one embodiment, the client device 160 is pre-installed with an app launcher, and downloads the packaging file D1 from the network server 140 by using the app launcher.

The transformation program E1 is stored in the memory unit 164. In one embodiment, the memory unit 164 is a hard disk, a solid-state disk, a random access memory, or other memory media capable of storing apps.

In one embodiment, the transformation program E1 is pre-stored in the memory unit 164 when the client device 160 leaves the factory. However, the disclosure is not limited thereto. In other embodiments, the transformation program E1 is also downloaded and stored in the memory unit 164 according to requirements during use by the user.

After the client device 160 obtains the packaging file D1, the processing unit 166 parses the packaging file D1 by using the transformation program E1, to obtain the script data B1, and renders the script data B1 and the source images B2 into an animated image F1 and presents the animated image on the screen 168.

In one embodiment, the processing unit 166 is a central processing unit (CPU), and the animated image F1 is an animated wallpaper or an animated icon.

The animated image publishing method of the disclosure is not only used to render the script data B1 into contents of the animated image F1, but also used to generate further display condition data after processing animated image data A1', which is to be described in detail below.

Figure 4:
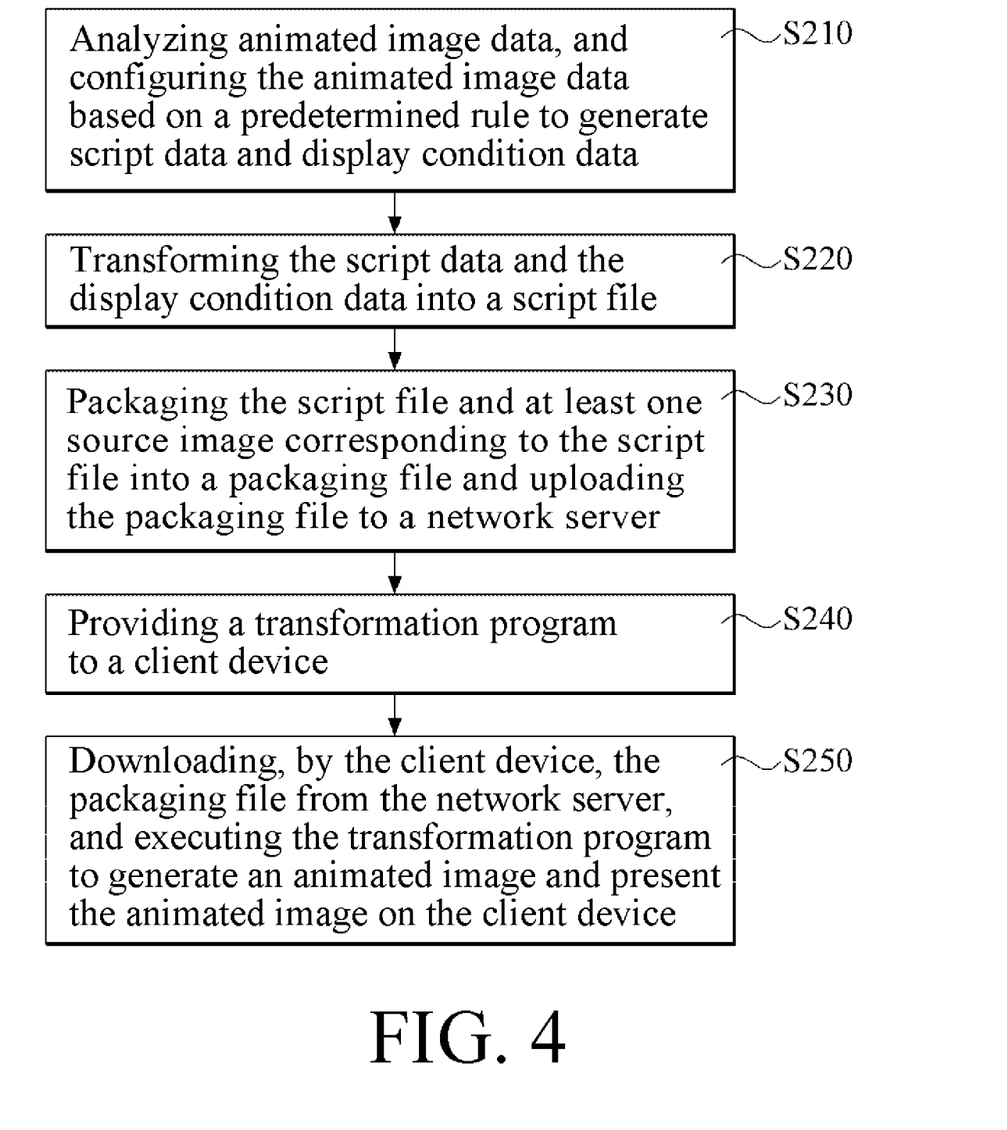
FIG. 4 is a flowchart of an animated image publishing method according to another embodiment of the disclosure.
Figure 5:
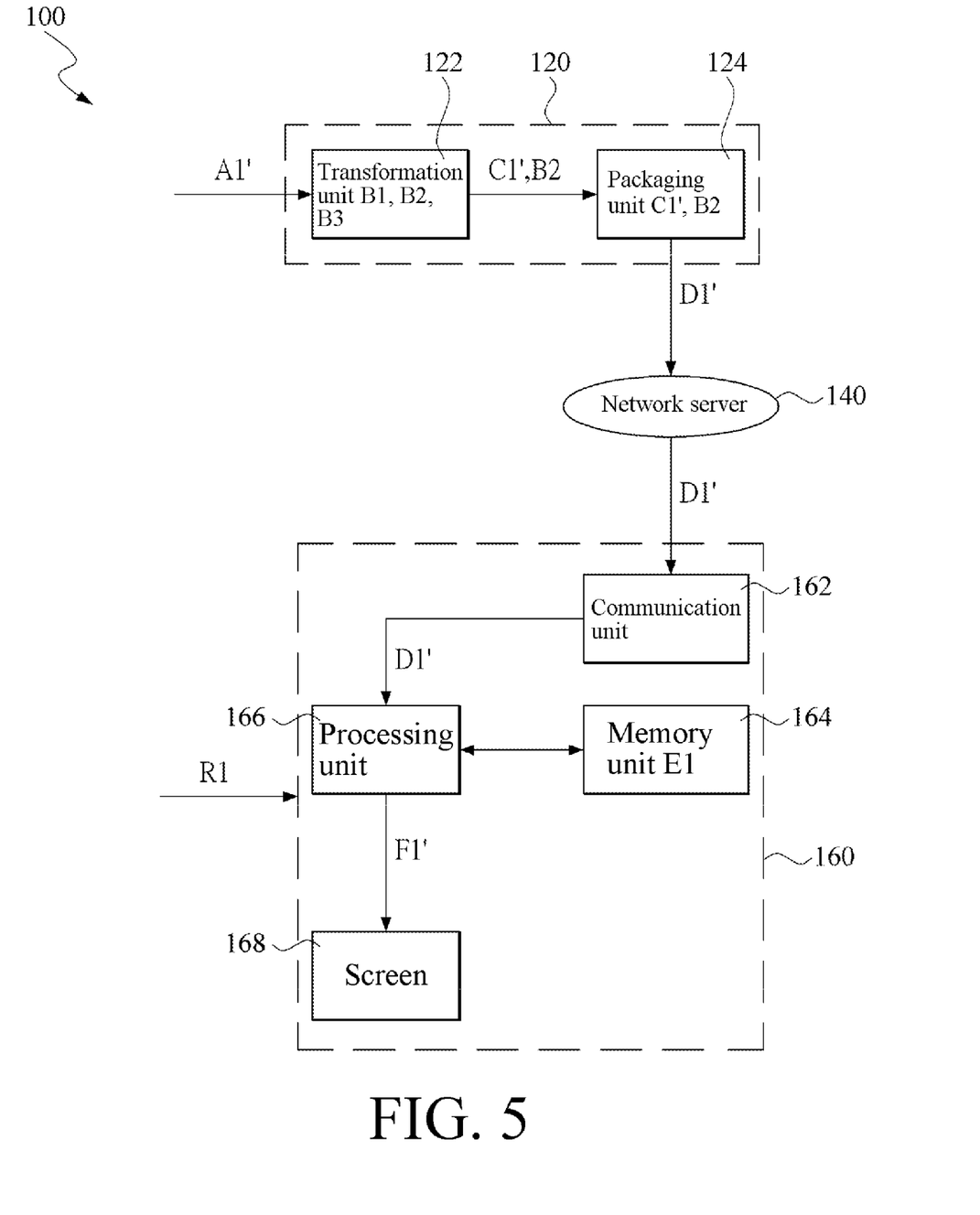
FIG. 5 shows an animated image publishing system to perform the animated image publishing method of FIG. 4.

FIG. 4 is a flowchart of an animated image publishing method according to another embodiment of the disclosure. FIG. 5 shows an animated image publishing system to perform the animated image publishing method of FIG. 4. The main difference between the animated image publishing method of this embodiment and the animated image publishing method of FIG. 1 is that the animated image data A1' of this embodiment includes display condition data B3.

As described in step S210, the step corresponds to step S110 in FIG. 1. That is, the animated image data A1' is analyzed, and the animated image data A1' is configured based on a predetermined rule to generate the script data B1 and the display condition data B3.

The display condition data B3 corresponds to a display condition, such as a time condition. That is to say, the animated image data A1' sets both the content of the animated image F1' and the display time of the animated image F1'.

Subsequent steps S220 to S240 are similar to steps S120 to S140 of FIG. 1. After the script data B1 and the display condition data B3 are analyzed, the analyzed script data B1 and the display condition data B3 are transformed into the script file C1' by using the transformation unit 122, to facilitate data transmission. The script file C1' and the corresponding source images B2 are then packaged into a packaging file D1' by using the packaging unit 124, and the packaging file is uploaded to the network server 140, to facilitate transmission and sharing.

Carrying on with step S240, as described in step S250, when the client device 160 receives the animated image generating request R1, the client device 160 immediately downloads the packaging file D1' from the network server 140, executes the transformation program E1 to transform the packaging file D1' into the script data B1 and the display condition data B3, and generates the animated image F1' based on the display condition set by the display condition data B3 and presents the animated image on the client device 160.

By setting the display condition, the client device 160 is configured to generate more diversified animated images F1'. In one embodiment, the display condition is a time condition, which is set as a trigger time of the animated image (in an embodiment, at night). In an embodiment, the client device 160 is set, by using the time condition, to present a static image during the day and present the animated image at night.

In addition, the time condition is also used to set the presentation times of animated images of different styles (that is, corresponding to different script data). In an embodiment, the client device 160 is set, by using the time condition, to present the daytime animated image during the day and present the nighttime animated image at night.

The daytime animated image and the nighttime animated image use the same set of source images, but use different script data B1. The script data B1 and the corresponding display condition data B3 are transformed into a plurality of script files C1, then the script files are packaged into a single packaging file D1', and the single packaging file is uploaded to the network server 140.

In addition to the time condition, the display condition is also whether a specific app is started or not as the condition for whether to generate the animated image. In an embodiment, the display condition is set such that the animated image F1' is generated to provide the animated effect when the client device 160 starts game software. In another embodiment, the display condition is set such that the animated image F1' is generated to provide the animated effect when the client device 160 is switched to a specific mode (such as an overclock mode).

Figure 6:
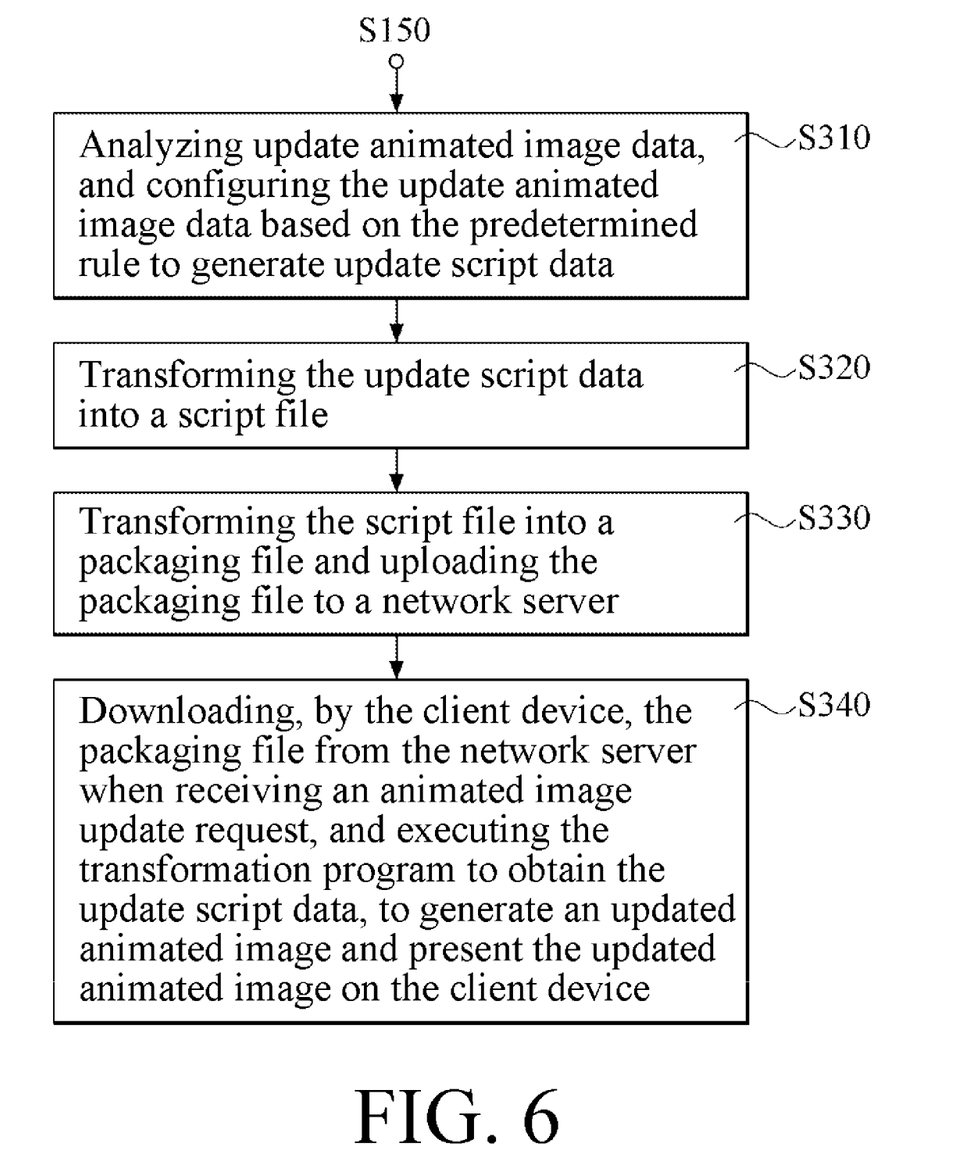
FIG. 6 is a flowchart of the animated image publishing method according to still another embodiment of the disclosure.
Figure 7:
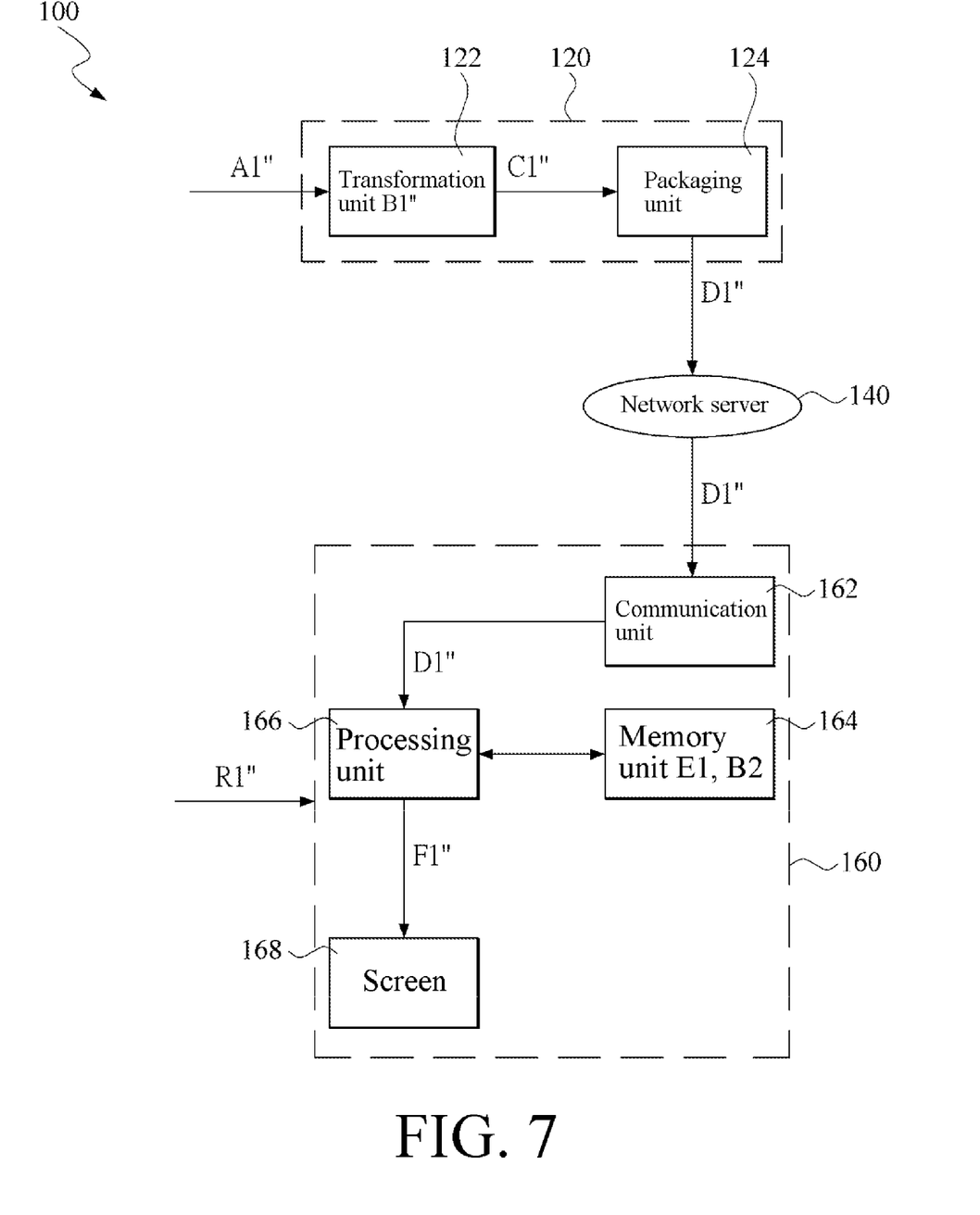
FIG. 7 shows an animated image publishing system to perform the animated image publishing method of FIG. 6.

FIG. 6 is a flowchart of the animated image publishing method according to still another embodiment of the disclosure. FIG. 7 shows an animated image publishing system to perform the animated image publishing method of FIG. 6. The animated image publishing method is for the operation of animated image updating.

Step S310 in the figure follows step S150 in FIG. 1. Before the process of FIG. 6 is performed, the client device 160 has downloaded the packaging file D1 to obtain the source images B2.

First, as described in step S310, updated animated image data A1" is analyzed, and the updated animated image data A1" is configured based on a predetermined rule to generate updated script data B1". Referring to FIG. 7, the step is performed by the transformation unit 122. The transformation unit 122 configures the updated script data B1" based on the received updated animated image data A1", but the corresponding source images are not obtained.

Then, as described in step S320, the updated script data B1" is transformed into a script file C1". Referring to FIG. 7, the step is performed by the transformation unit 122.

Next, as described in step S330, the script file C1" is transformed into the packaging file D1", and the packaging file is uploaded to the network server 140. Referring to FIG. 7, the step is performed by the packaging unit 124. In one embodiment, the script file C1" is also directly used as the packaging file D1". Then, as described in step S340, when the client device 160 receives an animated image update request R1", the client device 160 immediately downloads the packaging file D1" from the network server 140, executes the transformation program E1 to obtain the updated script data B1", and generates an updated animated image F1" in combination with the source images B2 previously obtained from the packaging file D1 and presents the updated animated image on the client device 160.

By means of the animated image publishing method of this embodiment, the user is only required to download the packaging file D1" from the network server 140 to obtain the updated script data B1" to generate the updated animated image F1" without needing to repeatedly download the source images B2.

According to the animated image publishing method, the disclosure further provides an animated image generating method, applied to the client device 160 in FIG. 1. The client device 160 includes a transformation program E1 and is adapted to connect to a network server 140. The network server 140 includes a packaging file D1.

Figure 8:
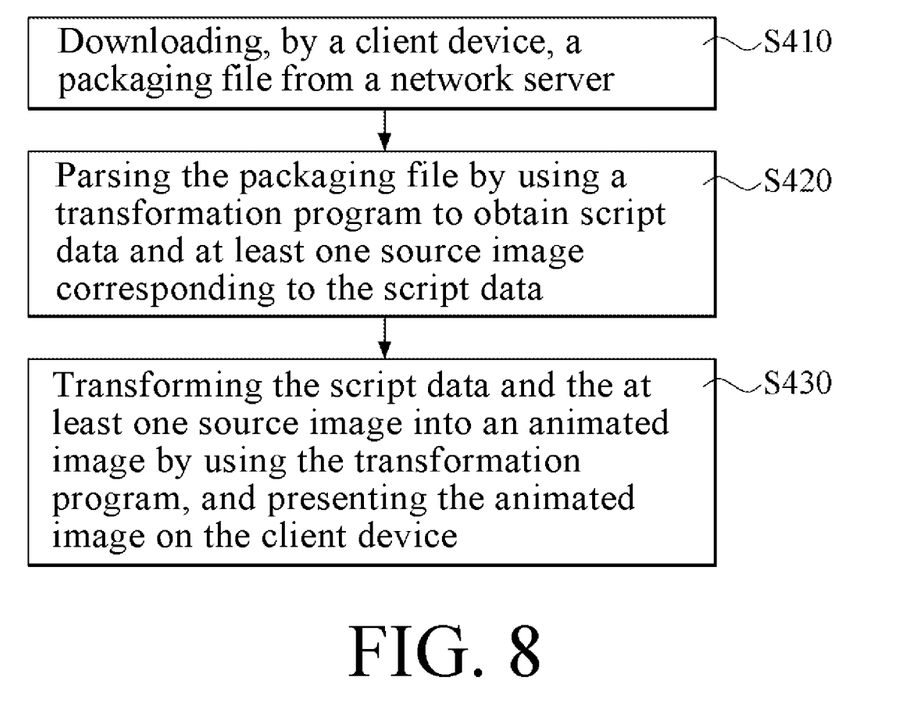
FIG. 8 is a flowchart of an animated image generating method according to an embodiment of the disclosure.

FIG. 8 is a flowchart of an animated image generating method according to an embodiment of the disclosure. The animated image generating method includes the following steps.

First, as described in step S410, the client device 160 downloads the packaging file D1 from the network server 140. The packaging file D1 includes script data B1 and a plurality of source images B2 corresponding to the script data B1.

Then, as described in step S420, the transformation program E1 is configured to parse the packaging file D1 to obtain the script data B1 and the corresponding source images B2.

Next, as described in step S430, the script data B1 and the source images B2 are transformed into an animated image F1 by using the transformation program E1, and the animated image F1 is presented on the client device 160.

By means of the animated image publishing method and the animated image generating method provided in the disclosure, the development time and modification costs of the animated image (such as an icon or a wallpaper) are saved, which is convenient for users to download and apply, so that the user interface of the client device 160 presents more animated effects.

The above is merely exemplary embodiments of the disclosure, and does not constitute any limitation on the disclosure. Any form of equivalent replacements or modifications to the technical means and technical content disclosed in the disclosure made by a person skilled in the art without departing from the scope of the technical means of the disclosure still fall within the content of the technical means of the disclosure and the protection scope of the disclosure.

What is claimed is:

1. An animated image publishing method, applied to a client device, comprising:
   analyzing animated image data and configuring the animated image data to generate script data and display condition data based on a predetermined rule;
   transforming the script data and the display condition data into a script file;
   packaging the script file and at least one source image corresponding to the script file into a packaging file and uploading the packaging file to a network server; and
   providing a transformation program to the client device,
   wherein the predetermined rule is to disassemble the animated image data by layer to obtain the at least one source image and layer information corresponding to each layer, and the layer information is configured to generate the script data,
   wherein the display condition data corresponds to a display condition,
   wherein the display condition corresponding to a day time and a night time, and
   wherein the client device generates a static image based on the script data when the display condition is the day time, and generates an animated image when the display condition is the night time.

2. The animated image publishing method according to claim 1, wherein the animated image data comprises a plurality of layer information and the at least one source image.

3. The animated image publishing method according to claim 1, wherein the script file is a JSON file.

4. The animated image publishing method according to claim 2, wherein the layer information comprises an animation parameter corresponding to the at least one source image.

5. The animated image publishing method according to claim 4, wherein the animation parameter is a size parameter, a light transmittance parameter, a move parameter, a rotation parameter, or a time parameter.

6. The animated image publishing method according to claim 1, wherein the animated image is an animated wallpaper or an animated icon.

7. An animated image generating method, applied to a client device, wherein the client device comprises a transformation program and is adapted to connect to a network server, the network server comprises a packaging file, and the packaging file comprises a script file and at least one source image corresponding to the script file, the animated image generating method comprising:
   downloading, by the client device, the packaging file from the network server;
   transforming the packaging file into the script file and the at least one source image by using the transformation program;
   parsing the script file by using the transformation program, to obtain script data and display condition data; and
   transforming the script data, the display condition data and the at least one source image into an animated image by using the transformation program, and presenting the animated image on the client device,
   wherein the script file is transformed from script data and display condition data which is are generated by configuring an animated image data based on a predetermined rule,
   wherein the predetermined rule is to disassemble the animated image data by layer to obtain the at least one source image and layer information corresponding to each layer, and the layer information is configured to generate the script data,
   wherein the display condition data corresponds to a display condition,
   wherein the display condition corresponding to a day time and a night time, and
   wherein the client device generates a static image based on the script data when the display condition is the day time, and generates an animated image when the display condition is the night time.

* * * * *